US012703025B2

(12) United States Patent
Hecht et al.

(10) Patent No.: US 12,703,025 B2
(45) Date of Patent: Aug. 11, 2026

(54) TURNING TOOL

(71) Applicants: ISCAR LTD., Tefen (IL); TUNGALOY CORPORATION, Fukushima (JP)

(72) Inventors: Gil Hecht, Nahariya (IL); Yusuke Suzuki, Iwaki (JP)

(73) Assignees: ISCAR LTD., Tefen (IL); TUNGALOY CORPORATION, Fukushima (JP)

( * ) Notice: Subject to any disclaimer, the term of this patent is extended or adjusted under 35 U.S.C. 154(b) by 403 days.

(21) Appl. No.: 18/547,064

(22) PCT Filed: Dec. 16, 2021

(86) PCT No.: PCT/JP2021/046484
§ 371 (c)(1),
(2) Date: Aug. 18, 2023

(87) PCT Pub. No.: WO2022/201674
PCT Pub. Date: Sep. 29, 2022

(65) Prior Publication Data

US 2024/0123516 A1 Apr. 18, 2024

(30) Foreign Application Priority Data

Mar. 23, 2021 (JP) ................................ 2021-048874

(51) Int. Cl.
*B23B 27/16* (2006.01)

(52) U.S. Cl.
CPC ................................ *B23B 27/1611* (2013.01)

(58) Field of Classification Search
CPC ..... B23B 27/1611; B23B 27/08; B23B 27/10; B23B 29/043; B23B 2200/0423; B23B 2200/369
See application file for complete search history.

(56) References Cited

U.S. PATENT DOCUMENTS

2001/0007215 A1* 7/2001 Murata .................. B23B 27/10 83/16
2009/0162154 A1 6/2009 Jonsson et al.
(Continued)

FOREIGN PATENT DOCUMENTS

EP 3702074 A1 9/2020
JP H07-031207 U 6/1995
(Continued)

OTHER PUBLICATIONS

International Preliminary Report on Patentability (Chapter I) and Written Opinion of the International Searching Authority issued in PCT/JP2021/046484; issued Sep. 12, 2023.
(Continued)

*Primary Examiner* — Kyle A Cook
(74) *Attorney, Agent, or Firm* — Studebaker Brackett PLLC

(57) ABSTRACT

A turning tool (1) that does not easily interfere with other tools and can supply a sufficient amount of coolant is provided. The turning tool (1) includes: a cutting insert (10) which is mirror-image symmetric with respect to a first and second symmetric surfaces (M1, M2); and a tool body (2) which has a first discharge port (5) to supply coolant to a first cutting edge (21E) of the cutting insert (10) from a first rake surface (21R) side. The first discharge port (5) is disposed between a second flat surface (32) and a first reference surface (Vxz) which is parallel with the second flat surface (32) and includes an edge line of the first cutting edge (21E).

4 Claims, 6 Drawing Sheets

(56) References Cited

U.S. PATENT DOCUMENTS

| | | | | |
|---|---|---|---|---|
| 2010/0196105 | A1* | 8/2010 | Amstibovitsky | B23B 27/10 407/11 |
| 2014/0050542 | A1 | 2/2014 | Zeeb et al. | |
| 2016/0236281 | A1* | 8/2016 | Kitagawa | B23B 27/10 |
| 2018/0318935 | A1 | 11/2018 | Kobayashi et al. | |
| 2019/0015904 | A1* | 1/2019 | Kobayashi | B23B 27/10 |
| 2019/0030613 | A1* | 1/2019 | Larsson | B23B 27/1662 |
| 2020/0361004 | A1* | 11/2020 | Kobayashi | B23B 1/00 |
| 2022/0134444 | A1* | 5/2022 | Schmidt | B23B 27/04 407/30 |

FOREIGN PATENT DOCUMENTS

| | | | |
|---|---|---|---|
| JP | 2003-071608 | A | 3/2003 |
| JP | 2011-005618 | A | 1/2011 |
| JP | 2012-218083 | A | 11/2012 |
| JP | 2014-509956 | A | 4/2014 |
| JP | 2016-055360 | A | 4/2016 |
| JP | 5988010 | B2 | 9/2016 |
| WO | 2015/056496 | A1 | 4/2015 |
| WO | 2017/018369 | A1 | 2/2017 |

OTHER PUBLICATIONS

International Search Report issued in PCT/JP2021/046484; mailed Jan. 25, 2022.

* cited by examiner 4
5C
5
33P(31D)
33D
33
21R
21
21E
21F
31
31P(30A)
35
13
6
22F
22
22E
22R
30
O
2D
34D
6C
34
34P(32D)
3
19
32
32P(30B)
2

1

4
T
P
γ
Q
2
10
5C
31
d1
19
5
O
3
R
δ
32
d2
33
6C
21R
α1
6
34
Vyz
β1
21E(21)
M2
22F
β2
α2
Vxz
21F
22R
Wyz
Wxz
22E(22)
1
Y
Z
X

TURNING TOOL

TECHNICAL FIELD

The present invention relates to a turning tool.

BACKGROUND ART

In a plurality of turning tools which are mounted in parallel on a comb type tool rest of a machine tool, the distance between adjacent turning tools is small. If a turning tool has a protruded portion in the Y axis direction, which is a direction where the turning tools are adjacent with each other, the turning tool may not be able to be mounted on the comb type tool rest, since this protruded portion interferes with the adjacent turning tool, which has already been mounted on this comb type tool rest, when mounting the turning tool on the comb type tool rest. Further, even if this turning tool can be mounted, the protruded portion may interfere and damage a work piece, when the work piece is being machined using the adjacent turning tool.

Patent Document 1 discloses a turning tool including a nozzle part (projected part 106) that supplies coolant to a cutting edge in a grooving machining to form a groove on a peripheral surface of a cylinder or in a cutting-off machining. By injecting the coolant to the cutting edge at high pressure, chips can be broken into small pieces and discharged efficiently. Further, the coolant supplied from the rake surface side cools the rake surface and prevents crater wear. Furthermore, the coolant supplied from the flank side can lubricate the flank and prevent boundary wear.

In the grooving and cutting-off machining, the work piece, which is driven by the main shaft of the machine tool and rotated around the Z axis thereby, is cut in the X axis direction, which is the diameter direction of the work piece, hence the flank faces in the X axis direction and the rake surface faces in the Y axis direction. In the case of the turning tool according to Patent Document 1, the nozzle part, which supplies the coolant from the rake surface side, extends from the shank part of the tool body in the Y axis direction.

While Patent Document 2 discloses a turning tool in which the angle of a discharge port of a nozzle part is changed sacrificing the supply amount of the coolant. If the traveling direction of the coolant connecting the cutting edge and the discharge port is not linear, as in the case of Patent Document 2, a turning tool, in which the nozzle part does not extend from the shank part, can be configured. However in this case, a sufficient amount of coolant may not be supplied to the cutting edge.

CITATION LIST

Patent Document

Patent Document 1: Patent Publication JP-A-2016-55360
Patent Document 2: Patent Publication JP-A-2003-71608

SUMMARY

Technical Problem

With the foregoing in view, it is an object of the present invention to provide a turning tool that does not easily interfere with other tools, and can supply a sufficient amount of coolant.

Solution to Problem

A turning tool according to an aspect of the present invention includes a replaceable cutting insert and a tool body that secures the cutting insert. The cutting insert is mirror-image symmetric with respect to a first symmetric surface which is perpendicular to a central axis of a mounting hole, and is mirror-image symmetric with respect to a second symmetric surface which includes the central axis. The cutting insert has a front surface, a rear surface which is on an opposite side to the front surface, a peripheral side surface which connects the front surface and the rear surface, and the mounting hole which penetrates the front surface and the rear surface. The peripheral side surface is formed parallel with the central axis. The peripheral side surface includes: a first cutting part constituted of a first cutting edge which is parallel with the central axis, and a first rake surface and a first flank which is adjacent to the first cutting edge; a second cutting part constituted of a second cutting edge which is mirror-image symmetric with the first cutting part with respect to the second symmetric surface and is parallel with the center axis, and a second rake surface and a second flank which is adjacent to the second cutting edge; a base end part which is on the opposite side to a leading end part where the first cutting part and the second cutting part are disposed; a third flat surface which continues to the first rake surface; a first flat surface which connects the third flat surface and one end of the base end part; a fourth flat surface which is mirror-image symmetric with the third flat surface with respect to the second symmetric surface and continues to the second rake surface; and a second flat surface which is mirror-image symmetric with the first flat surface with respect to the second symmetric surface and connects the fourth flat surface and the other end of the base end part. The tool body includes: an insert mounting seat which secures the cutting insert in an orientation in which the second flat surface is parallel with a longitudinal direction of the tool body, in a state where the first cutting part is usable; and a first discharge port which supplies coolant to the first cutting edge from the first rake surface side, in a state where the first cutting part is usable. The first discharge port is disposed between the second flat surface and a first reference surface which is parallel with the second flat surface, and includes an edge line of the first cutting edge.

According to this aspect, the first discharge port is on the inner side of the tool body, than the edge of the first cutting edge, in a direction in which the turning tools are adjacent to each other, hence the portion where the first discharge port is disposed does not easily protrude from the shank part of the tool body. Therefore the turning tool which does not easily interfere with the other tools, can be provided.

In the above aspect, the third flat surface may be inclined so as to be closer to the second flat surface in a direction toward the base end part, and the fourth flat surface, which is mirror-image symmetric with the third flat surface with respect to the second symmetric surface, may be inclined so as to be closer to the first flat surface in the direction toward the base end part.

According to this aspect, a space between the first reference surface and the third flat surface increases as the inclination of the third flat surface increases, hence coolant can more easily be supplied directly from the first discharge port to the first cutting edge. Since the amount of the coolant that can be supplied to the first cutting edge increases, a turning tool that can supply a sufficient amount of coolant can be provided.

In the above aspect, an orientation of the first discharge port may be determined so that a locus of the coolant directed from the first discharge port to the first cutting edge is approximately parallel with the third flat surface, in the state where the first cutting part is usable.

As the third flat surface inclines more, coolant is more easily supplied, but a wedge angle of the edge of the first cutting part decreases. However according to this aspect, the third flat surface is not inclined more than necessary, and is parallel with the locus of the coolant that is directly supplied from the first discharge port to the first cutting edge. Since the third flat surface is inclined at a minimum angle, the coolant can be easily supplied directly from the first discharge port to the first cutting edge, and a large wedge angle can be more easily secured for the edge of the first cutting part.

In the above aspect, the second discharge port may be located closer to the base end side of the tool body than the second cutting edge.

According to this aspect, the cutting insert is secured in an orientation in which the second flat surface is parallel with the longitudinal direction of the tool body, hence the longitudinal direction of the tool body, the first cutting part and the second cutting part are not at the same positions, but the first cutting part recedes more toward the base end side of the tool body than the second cutting part. Since the position directly under the first cutting part which receives the main cutting force of the cutting resistance can be closer to the insert mounting seat, the second discharge port, that supplies coolant from the part directly under the first cutting edge, can also be formed at a position which recedes more toward the base end side than the second cutting part. Configuration of the tool body in the longitudinal direction can be more compact because the second discharge port does not protrude from the cutting insert at the leading end part of the tool body.

Advantageous Effects of Invention

According to the present invention, a turning tool that does not easily interfere with other tools and can supply a sufficient amount of coolant can be provided.

DESCRIPTION OF EMBODIMENTS

Figure 1:
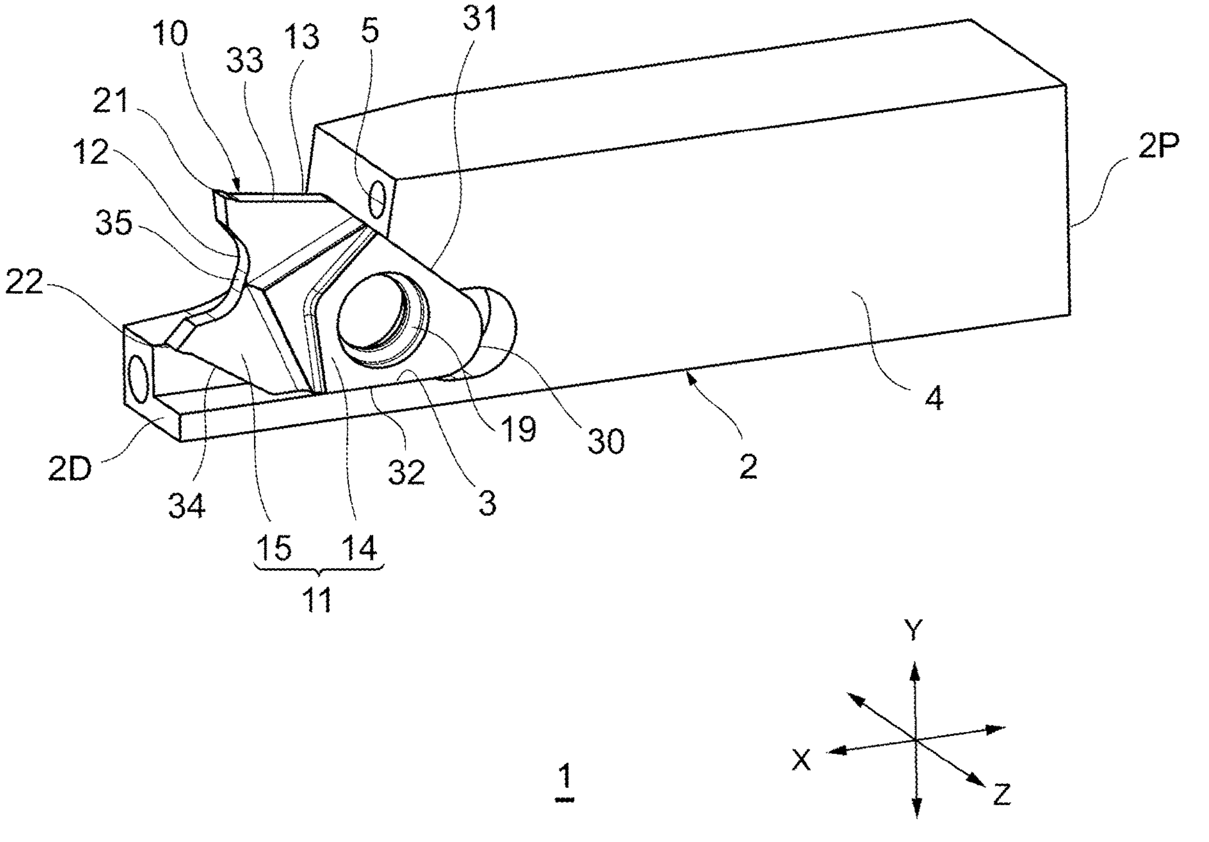
FIG. 1 is a perspective view depicting an example of the turning tool according to an embodiment of the present invention.

Embodiments of the present invention will be described with reference to the accompanying drawings. In each drawing, composing elements denoted with a same reference sign have an identical or similar configuration. Each configuration will now be described in detail with reference to FIG. 1 to FIG. 6. FIG. 1 is a perspective view depicting an example of a turning tool 1 according to an embodiment of the present invention. The turning tool 1 of the embodiment of the present invention is mounted on a comb type tool rest of a machine tool, and is used for grooving and cutting-off machining.

As indicated in FIG. 1, the indexable turning tool 1 includes a replaceable cutting insert 10 and a tool body 2 which secures the cutting insert 10, and is used in a state of being secured to a tool rest, or the like. In the case of using a plurality of turning tools, including the turning tool 1, that are mounted on a comb type tool rest of a machine tool, these turning tools are disposed next to each other in parallel with the Y axis direction in FIG. 1. The X axis direction, which is the longitudinal direction of the tool body 2 in the view of the operator, matches with the top-bottom direction, for example, and the Y axis direction, in which the turning tools 1 are disposed next to each other, matches with the front-back direction, for example, and the Z axis direction, which is parallel with the rotational axis of the work piece, matches with the left-right direction, for example.

Figure 2:
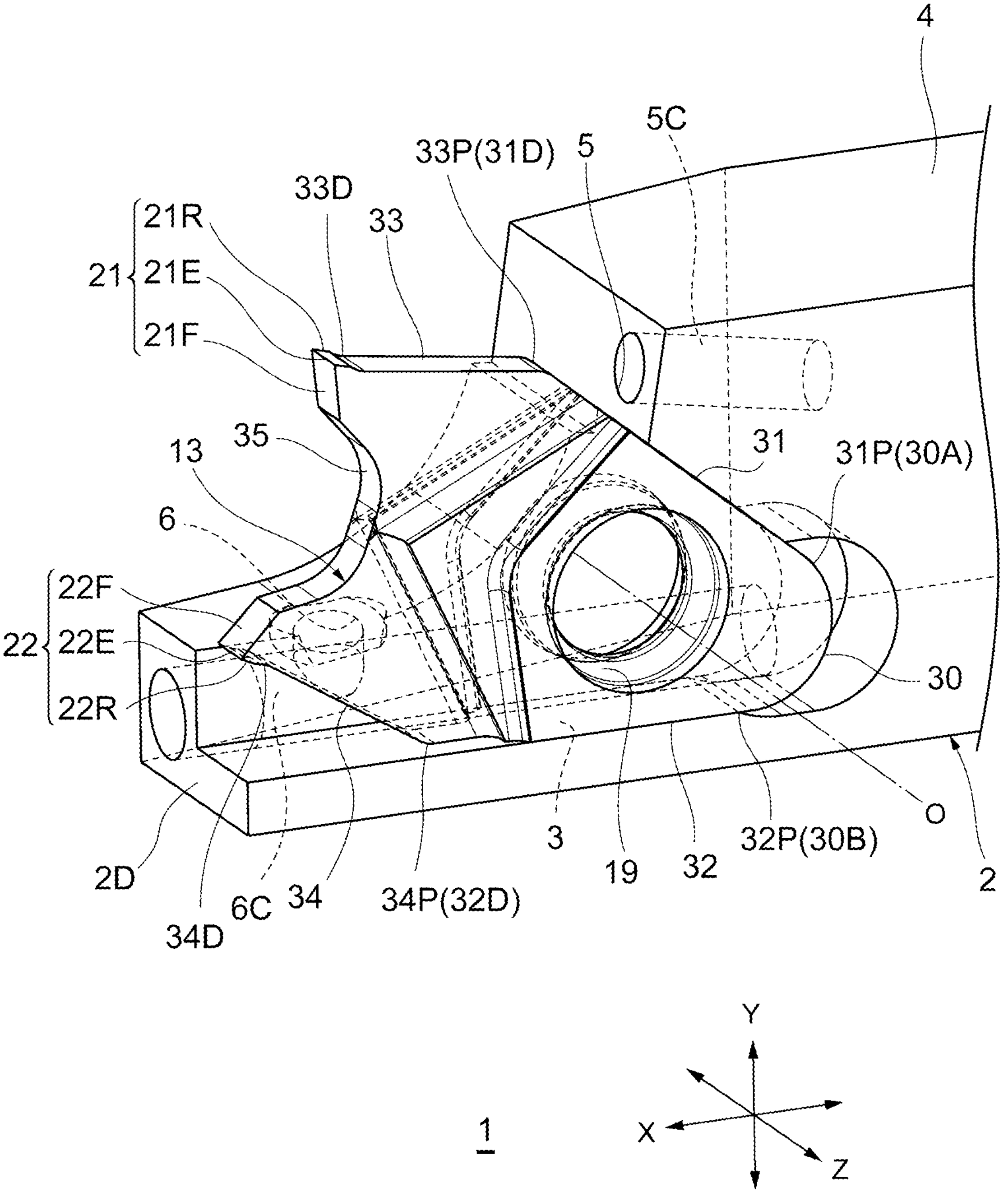
FIG. 2 is a perspective view depicting an internal structure of the turning tool in FIG. 1.

FIG. 2 is a perspective view of an internal structure of the turning tool 1 in FIG. 1. As illustrated in FIG. 2, in the tool body 2, an insert mounting seat 3, which is recessed in a shape matching with the cutting insert 10, and first and second discharge ports 5 and 6, which supply coolant to the cutting insert 10 secured to the insert mounting seat 3, are disposed in a leading end part, which includes a leading end 2D of the tool body 2 and a neighboring portion thereof. The first discharge port 5 supplies the coolant from a later mentioned first rake surface 21R side to a first cutting edge 21E, and the second discharge port 6 supplies the coolant from a later mentioned first flank 21F side to the first cutting edge 21E. When the coolant is supplied from the first and second discharge ports 5 and 6, chip discharge performance improves, and the first cutting edge 21E can be cooled.

In the tool body 2, a shank part 4, which constitutes a portion from a base end 2P on the opposite side to the leading end 2D to the above mentioned leading end part, is formed to be quadrangular prism-shaped which does not have a protruded portion in the Y axis direction. Inside the shank part 4, a channel of the coolant that is connected to the first and second discharge ports 5 and 6 is formed. The coolant may be supplied via a hose connected to the base end 2P of the tool body 2, or may be directly supplied from the tool rest without a hose.

The cutting insert 10 is secured to the insert mounting seat 3 by a fastening screw or the like (not illustrated), so that a central axis O of a mounting hole 19 becomes the Z axis direction, and one of the later mentioned second flat surface 32 and the first flat surface 31 becomes parallel with the XZ plane. The cutting insert 10 includes a front surface (first principal surface) 11, a rear surface (second principal surface) 12 on the opposite side of the front surface 11, a peripheral side surface 13 which connects the front surface 11 and the rear surface 12, a mounting hole 19 which penetrates the front surface 11 and the rear surface 12, and first and second cutting parts 21 and 22 which are formed on the peripheral side surface 13. The first cutting part 21 is used in a state where the rear surface 12 is on the insert mounting seat 3 side, and the second cutting part 22 is used in a reversed state thereof, that is, in a state where the front surface 11 is on the insert mounting seat 3 side.

Figure 3:
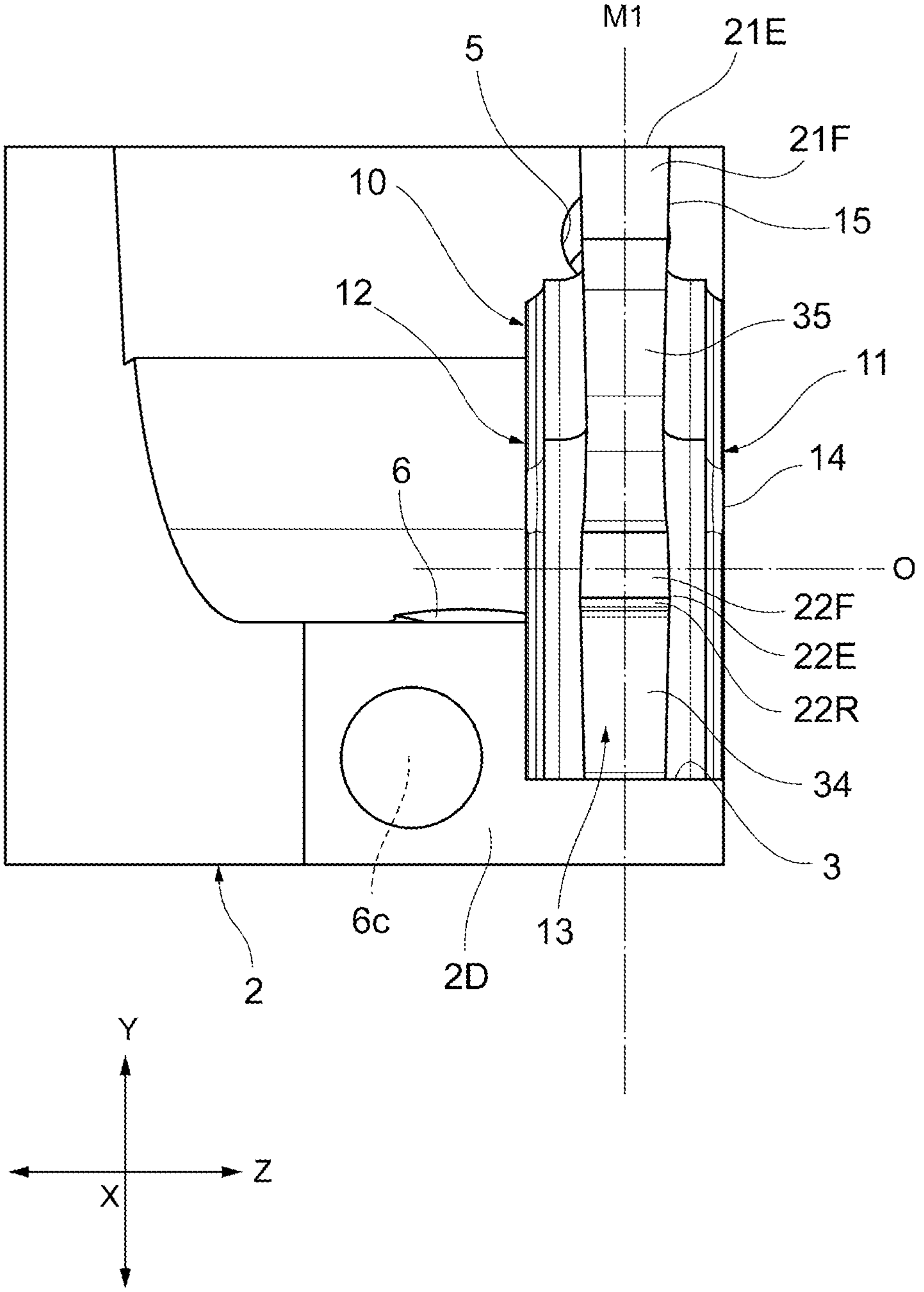
FIG. 3 is a front view of the turning tool in FIG. 1, viewed from the leading end side.

FIG. 3 is a front view of the turning tool 1 in FIG. 1 viewed from the leading end 2D side of the tool body 2. As illustrated in FIG. 3, the cutting insert 10 is mirror-image symmetric with respect to a first symmetric surface M1, which is perpendicular to the central axis O of the mounting hole 19. The first symmetric surface M1 is parallel with the XY plane, and is located equally distant from the front surface 11 and the rear surface 12, bisecting the plate thickness of the cutting insert 10.

On the front surface 11 and the rear surface 12, a thick region 14, where the plate thickness between the front surface 11 and the rear surface 12 is large, and a thin region where this plate thickness is smaller than the thick region 14, are formed. The mounting hole 19 (indicated in FIG. 2) is formed in the thick region 14. The first and second cutting parts 21 and 22 are formed in the thin region 15.

Figure 4:
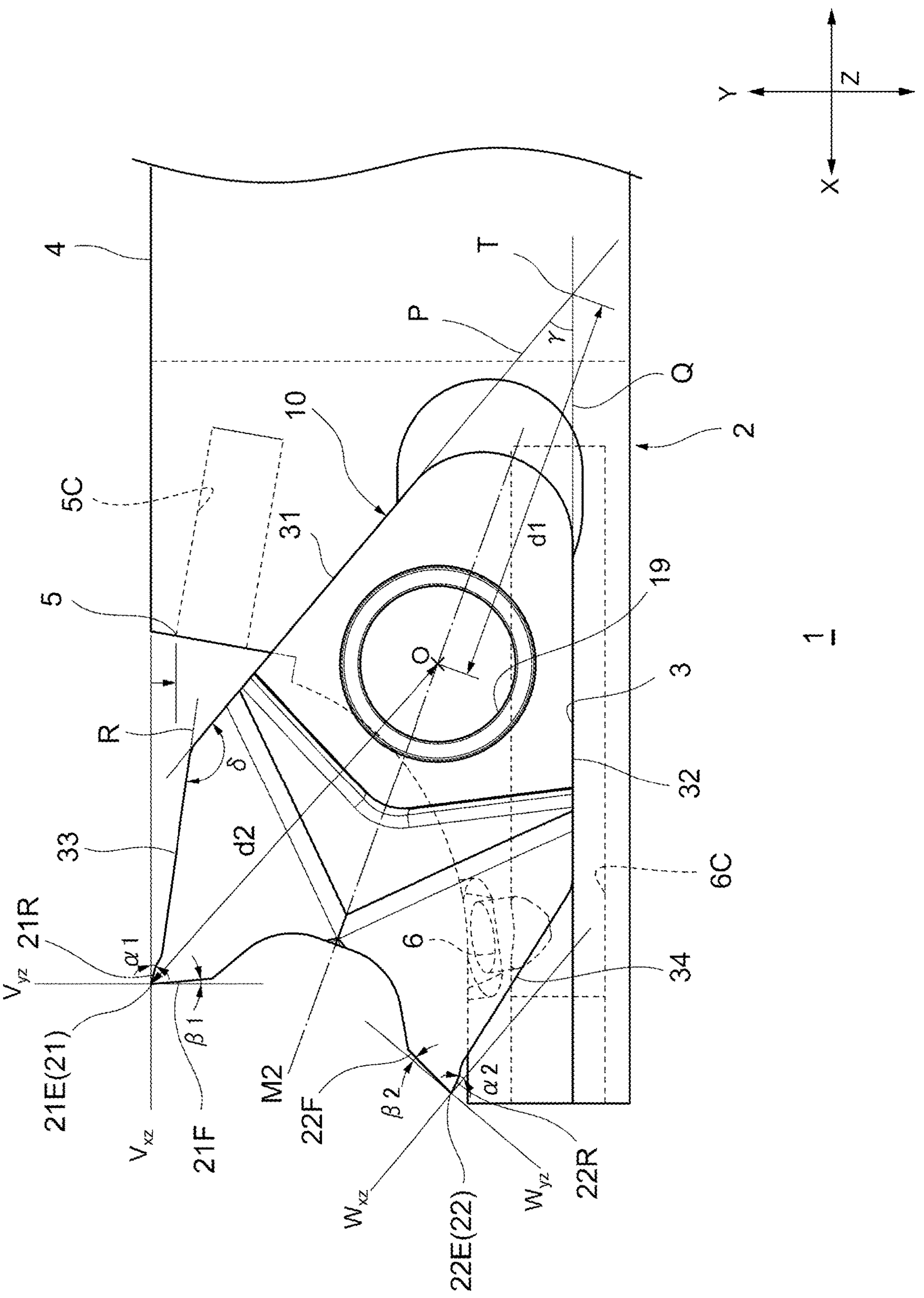
FIG. 4 is a side view of the turning tool in FIG. 1, viewed from the front surface side of the cutting insert.

FIG. 4 is a side view of the turning tool 1 in FIG. 1 viewed from the front surface 11 side of the cutting insert 10. As illustrated in FIG. 4, the cutting insert 10 is mirror-image symmetric with respect to a second symmetric surface M2, including the central axis O. The second symmetric surface M2 intersects so as to be perpendicular to the XY plane and to form a 20° angle with the YZ plane, and is located equally distant from the first and second end cutting parts 21 and 22, bisecting the front surface 11 and the rear surface 12.

Description continues with reference to FIG. 2. As illustrated in FIG. 2, the cutting insert 10 is formed so that the peripheral side surface 13 is parallel with the central axis O. In addition to the above mentioned first and second cutting parts 21 and 22, the peripheral side surface 13 further includes: a base end part 30, which is on the opposite side of the leading end part (21, 22), where the first and second cutting parts 21 and 22 are formed; first and third flat surfaces 31 and 33 connecting the base end part 30 and the first cutting part 21; second and fourth flat surfaces 32 and 34 connecting the base end part 30 and the second cutting part 22; and a connection surface 35 connecting the first cutting part 21 and the second cutting part 22.

Each of the first to fourth flat surfaces 31, 32, 33 and 34 has a base end which is close to the base end part 30, and a leading end which is close to the leading end part (21,22), and is formed to be a flat plane from the base end to the leading end. The base end part 30 is formed on a part of a cylindrical surface, and has one end 30A and the other end 30B which is on the opposite side of the one end. The connection surface 35 is formed to be a curved surface which is recessed toward the base end part 30 side, and has one end 35A and the other end 35B which is on the opposite side of the one end.

The first cutting part 21 is constituted of a first cutting edge 21E which is parallel with the central axis O, and a first rake surface 21R and a first flank 21F which is adjacent to the first cutting edge 21E. In the same manner, the second cutting part 22 is constituted of a second cutting edge 22E which is parallel with the central axis O, and a second rake surface 22R and a second flank 22F which is adjacent to the second cutting edge 22E. An edge line where the first rake surface 21R and the first flank 21F intersect is the first cutting edge 21E, and an edge line where the second rake surface 22R and the second flank 22F intersect is the second cutting edge 22E.

The leading end 33D of the third flat surface 33 continues to the first rake surface 21R of the first cutting part 21. The first flat surface 31 connects the base end 33P of the third flat surface 33 and one end 30A of the base end part 30. In the same manner, the leading end 34D of the fourth flat surface 34 continues to the second rake surface 22R of the second cutting part 22. The second flat surface 32 connects the base end 34P of the fourth flat surface 34 and the other end 30B of the base end part 30. Each of the first and second flat surfaces 31 and 32 is formed so as to extend over the portion where the peripheral side surface 13 is adjacent to the thick region 14 and the portion where the peripheral side surface 13 is adjacent to the thin region 15.

In a case where R chamfering or C chamfering has been performed at the boundary portion between the first flat surface 31 and the third flat surface 33, the positions of the leading end 31D of the first flat surface 31 and the base end 33P of the third flat surface 33 are mid-positions between the start point and the end point where the curvature of the R chamfering changes, or are mid-positions of one edge line and the other edge line of the C chamfering. In the same manner, the positions of the leading end 32D of the second flat surface 32 and the base end 34P of the fourth flat surface 34 are mid-positions of the chamfered surface, where the R chamfering or the C chamfering has been performed.

The front surface 11 and the rear surface 12 are mirror-image symmetric with respect to the above mentioned first symmetric surface M1. Each of the first cutting edge 21E, the first rake surface 21R and the first flank 21F constituting the first cutting part 21, and each of the second cutting edge 22E, the second rake surface 22R and the second flank 22F constituting the second cutting part 22 are mirror-image symmetric with respect to the above mentioned second symmetric surface M2. In the same manner, the first and second flat surfaces 31 and 32 are mirror-image symmetric with respect to the second symmetric surface M2, and the third and fourth flat surfaces 33 and 34 are mirror-image symmetric with respect to the second symmetric surface M2.

In other words, the rear surface 12, the second cutting part 22, and the second and fourth flat surfaces 32 and 34 have approximately the same shapes and functions as the front surface 11, the first cutting part 21 and the first and third flat surfaces 31 and 33 respectively. Hence the first cutting part 21, and the first and third flat surfaces 31 and 33 will be described in detail, and redundant description on the second cutting part 22 and the second and fourth flat surfaces 32 and 34 may be omitted.

Description continues with reference to FIG. 4. One characteristic of the turning tool 1 of the present embodiment is that one of the second flat surface 32 and the first flat surface 31, not the second symmetric surface M2 of the cutting insert 10, is formed to be parallel with the longitudinal direction X of the tool body 2. As illustrated in FIG. 4, the first rake surface 21R includes an edge line of the first cutting edge 21E, that is, an intersecting edge of the first rake surface 21R and the first flank 21F, and has a positive clearance angle $\alpha$1 with respect to the first reference surface Vxz, which is parallel with the second flat surface 32. The first flank 21F includes an edge line of the first cutting edge 21E, that is, an intersecting edge of the first rake surface 21R and the first flank 21F, and has a positive clearance angle $\beta$1 with respect to the third reference surface Vyx, which is perpendicular to the second flat surface 32, or a virtual plane (second virtual plane) Q extending the second flat surface 32.

In the same manner, the second rake surface 22R, which is mirror-image symmetric with the first rake surface 21R with respect to the second symmetric surface M2, includes an edge line of the second cutting edge 22E, that is, an intersecting edge of the second rake surface 22R and the second flank 22F, and has a positive rake angle $\alpha$2 with respect to the second reference surface Wxz which is parallel with the first flat surface 31. The second flank 22F, which is mirror-image symmetric with the first flank 21F with respect to the second symmetric surface M2, includes an edge line of the second cutting edge 22E, that is, an intersecting edge of the second rake surface 22R and the second flank 22F, and has a positive clearance angle β2 with respect to the fourth reference surface Wyz which is perpendicular to the first flat surface 31, or a virtual plane (first virtual plane) P extending the first flat surface 31.

The virtual plane P and the virtual plane Q intersect at about the 30° to 45° intersecting angle γ. In the illustrated example, the intersecting angle γ is 40°. A distance d1, from the intersecting line T at which the virtual planes P and Q intersect to the central axis O of the mounting hole 19, is longer than a distance d2 from the edge line of the first cutting edge 21E of the first cutting part 21. Since the distance d2 between a fastening screw, to secure the cutting insert 10, and the first cutting part 21 or the second cutting part 22, to which the main cutting force of the cutting resistance is applied, is short, the turning tool 1 has a high rigidity.

The third flat surface 33 is inclined so as to be closer to the second flat surface 32 in the direction toward the base end part 30, and the fourth flat surface 34, which is mirror-image symmetric with the third flat surface 33 with respect to the second symmetric surface M2, is inclined so as to be closer to the first flat surface 31 in the direction toward the base end part 30. The intersecting angle δ of the virtual planes P and R can be appropriately changed within a range where the first flank has a positive clearance angle β1, and a wedge angle (90°-α1-β1) on the edge of the first cutting part 21 does not becomes extremely small. When the intersecting angle γ of the virtual planes P and Q is about 40°, the intersecting angle δ is at least 100° and not more than 160°, for example, and is preferably at least 135° and not more than 160°. In the illustrated example, the intersection angle δ is 150°.

One characteristic of the turning tool 1 of the present embodiment is that the first discharge port 5, which supplies the coolant from the first rake surface 21R side to the first cutting edge 21E, is located between the first reference surface Vxz and the second flat surface 32. In the illustrated example, the third flat surface 33 is inclined so as to be closer to the second flat surface 32 in the direction toward the base end part 30, hence a space where the coolant can travel opens between the first reference surface and the third flat surface. In other words, the coolant can be easily supplied directly from the first discharge port 5 to the first cutting edge 21E.

In the case where the third flat surface 33 is inclined with respect to the second flat surface 32, it is preferable that the direction of the channel 5C of the first discharge port 5 is determined so that the locus of the coolant from the first discharge port 5 to the first cutting edge 21E is approximately parallel with the third flat surface 33 in a state where the first cutting part 21 is usable, so that the wedge angle of the edge of the first cutting part 21 does not become too small.

The third flat surface 33 may be formed parallel with the second flat surface 32, and the fourth flat surface 34 may be formed parallel with the first flat surface 31. In the case where the third flat surface 33 is parallel with the second flat surface 32, the coolant cannot be supplied directly to the first cutting edge 21E if the first discharge port 5 is located between the second flat surface 32 and the first reference surface Vxz. Therefore the orientation of the channel 5C of the first discharge port 5 may be changed so that the coolant is injected to the work piece rotating toward the first rake surface 21R, and the coolant that contacts the work piece and is reflected therefrom is supplied to the first rake surface 21R.

Figure 5:
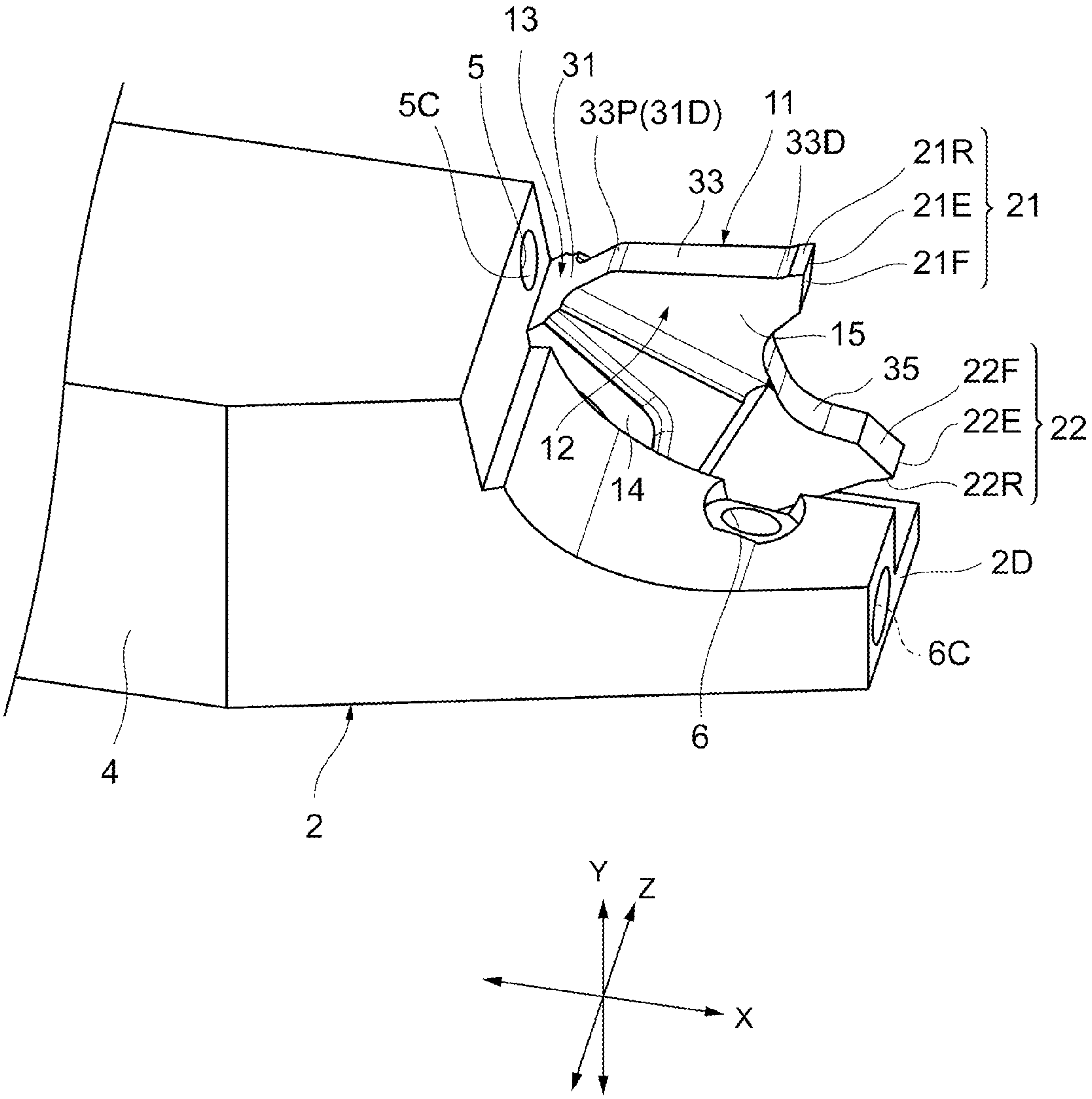
FIG. 5 is a perspective view of the second discharge port indicated in FIG. 2, viewed from the rear surface side of the cutting insert.
Figure 6:
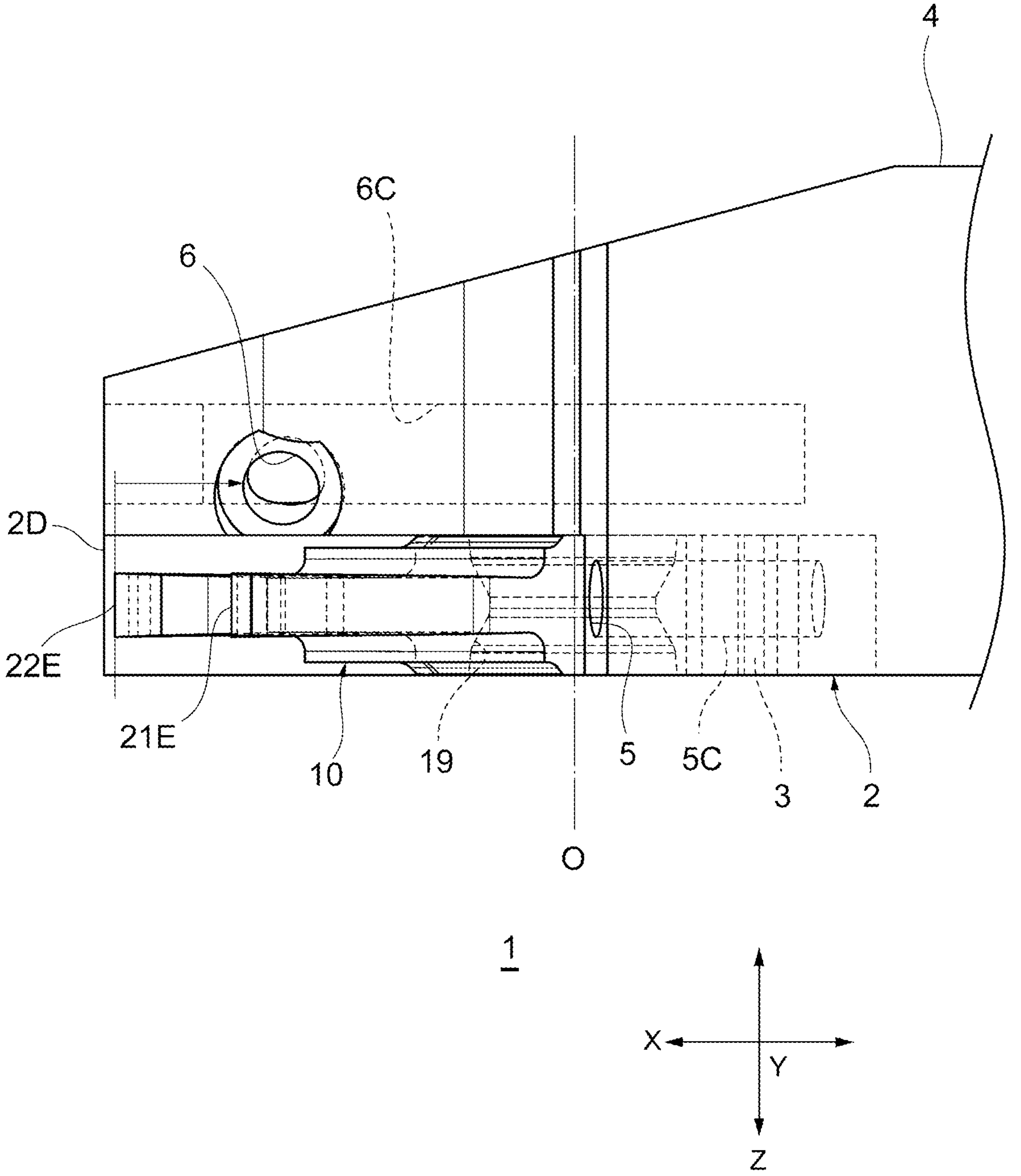
FIG. 6 is a plan view of the second discharge port indicated in FIG. 5, viewed from the direction parallel with the rotational axis of the main shaft of the machine tool.

FIG. 5 is a perspective view of the second discharge port 6 indicated in FIG. 2 viewed from the rear surface 12 side of the cutting insert 10. As illustrated in FIG. 5, the second discharge port 6 is disposed directly under the first cutting edge 21E, and the coolant is supplied from the first flank 21F side to the first cutting edge 21E. FIG. 6 is a side view of the second discharge port 6 indicated in FIG. 5 viewed from the direction parallel with the rotational axis of the main shaft of the machine tool. As illustrated in FIG. 6, a channel 6C, which supplies the coolant to the second discharge port 6, is formed from the leading end 2D to the base end 2P of the tool body 2. The leading end of the channel 6C is closed by a lock screw with a hexagonal hold or the like.

As described above, in the turning tool 1 of the present embodiment, the cutting insert 10 is secured in an orientation where the second flat surface 32 is parallel with the X axis direction, which is the longitudinal direction of the tool body 2. Therefore as illustrated in FIG. 6, the first cutting part 21 and the second cutting part 22 are not at the same position in the X axis direction, and the first cutting part 21 recedes more toward the base end 2P side of the tool body 2 than the second cutting part 22. Since the second discharge port 6, to which the coolant is supplied from a part directly under the first cutting part 21, can also be formed at a position that recedes more toward the base end 2P side than the second cutting part 22, the length of the tool body 2 in the X axis direction can be compact.

As described above, according to the turning tool 1 of the present embodiment configured like this, the third and fourth flat surfaces 33 and 34 having an intersecting angle δ with respect to the first and second flat surfaces 31 and 32 are formed in the cutting insert 10, hence, one of the second flat surface 32 and the first flat surface 31, not the second symmetric surface M2, can be disposed to be parallel with the longitudinal direction X of the tool body 2. Further, the first cutting part 21 recedes more toward the base end 2P side of the tool body 2 than the second cutting part 22, and the distance thereof with the insert mounting seat 3 decreases, hence the turning tool 1, which is more rigid, can be formed compared with the case of disposing the second symmetric surface M2 to be parallel with the longitudinal direction X of the tool body 2. Furthermore, in the Y axis direction, the first discharge port 5, which supplies the coolant to the first cutting edge 21E from the first rake surface 21R side, is on the inner side of the tool body 2 than the edge of the first cutting edge 21E, hence the portion where the first discharge port 5 does not easily protrude from the shank part 4 of the tool body 2. Therefore the turning tool 1, which does not easily interfere with other tools, can be provided.

Embodiments described above are for assisting an understanding of the present invention, and are not intended to limit the interpretation of the present invention. Each composing element of the embodiments, and the positions, materials, conditions, shapes and sizes thereof are not limited to the examples, but may be changed appropriately. Further, composing elements described in different embodiments may be partially replaced or combined.

REFERENCE SIGNS LIST

1 Turning tool
2 Tool body
2D Leading end
2P Base end
3 Insert mounting seat
4 Shank part
5 First discharge port 6 Second discharge port
5C, 6C Channel
10 Cutting insert
11 Front surface
12 Rear surface
13 Peripheral side surface
14 Thick region
15 Thin region
19 Mounting hole
21 First cutting part
21E First cutting edge
21F First flank
21R First rake surface
22 Second cutting part
22E Second cutting edge
22F Second flank
22R Second rake surface
(21, 22) Leading end part
30 Base end part
30A One end
30B The other end
31 First flat surface
31D The other end
31P One end
32 Second flat surface
32D The other end
32P One end
33 Third flat surface
33D The other end
33P One end
34 Fourth flat surface
34D The other end
34P One end
35 Connection surface
35A One end
35B The other end
d1, d2 Distance
M1 First symmetric surface
M2 Second symmetric surface
O Central axis
P, Q, R Virtual planes
T, U Intersecting lines
Vxz First reference surface
Vyx Third reference surface
Wxz Second reference surface
Wyz Fourth reference surface
X Top-bottom direction
Y Front-back direction
Z Left-right direction
α1, α2 Rake angles
β1, β2 Clearance angles
γ, δ Intersecting angles

What is claimed is:

1. A turning tool comprising: a replaceable cutting insert; and a tool body that secures the cutting insert, wherein the cutting insert is mirror-image symmetric with respect to a first symmetric surface which is perpendicular to a central axis of a mounting hole, and is mirror-image symmetric with respect to a second symmetric surface which extends along the central axis, the cutting insert has a front surface, a rear surface which is on an opposite side to the front surface, a peripheral side surface which connects the front surface and the rear surface, and the mounting hole which penetrates the front surface and the rear surface, and the peripheral side surface is formed parallel with the central axis, and the peripheral side surface includes:

a first cutting part constituted of a first cutting edge which is parallel with the central axis, and a first rake surface and a first flank which is adjacent to the first cutting edge;

a second cutting part constituted of a second cutting edge which is mirror-image symmetric with the first cutting part with respect to the second symmetric surface and is parallel with the central axis, and a second rake surface and a second flank which is adjacent to the second cutting edge;

a base end part which is on the opposite side to a leading end part where the first cutting part and the second cutting part are disposed;

a third flat surface which continues from the first rake surface;

a first flat surface which extends towards the third flat surface from one end of the base end part;

a fourth flat surface which is mirror-image symmetric with the third flat surface with respect to the second symmetric surface and continues to the second rake surface; and a second flat surface which is mirror-image symmetric with the first flat surface with respect to the second symmetric surface and extends towards the fourth flat surface from the other end of the base end part, wherein a boundary portion between the third flat surface and first flat surface is non-planar, wherein a boundary portion between the fourth flat surface and second flat surface is non-planar, the tool body includes:

an insert mounting seat which secures the cutting insert in an orientation in which the second flat surface is parallel with a longitudinal direction of the tool body, in a state where the first cutting part is usable; and a first discharge port which supplies coolant to the first cutting edge from the first rake surface side, in a state where the first cutting part is usable, and the first discharge port is disposed between the second flat surface and a first reference surface which is parallel with the second flat surface and extends along an edge line of the first cutting edge.

2. The turning tool according to claim 1, wherein the third flat surface is inclined so as to become closer to the second flat surface in a direction toward the base end part, and the fourth flat surface, which is mirror-image symmetric with the third flat surface with respect to the second symmetric surface, is inclined so as to become closer to the first flat surface in the direction toward the base end part.

3. The turning tool according to claim 1, wherein the orientation of the first discharge port is determined so that a locus of the coolant directed from the first discharge port to the first cutting edge is approximately parallel with the third flat surface, in the state where the first cutting part is usable.

4. The turning tool according to claim 1, wherein the tool body further includes a second discharge port which supplies coolant from the first flank side to the first cutting edge, in the state where the first cutting part is usable, and the second discharge port is located closer to a base end side of the tool body than the second cutting edge.

* * * * *